United States Patent Office 3,404,124
Patented Oct. 1, 1968

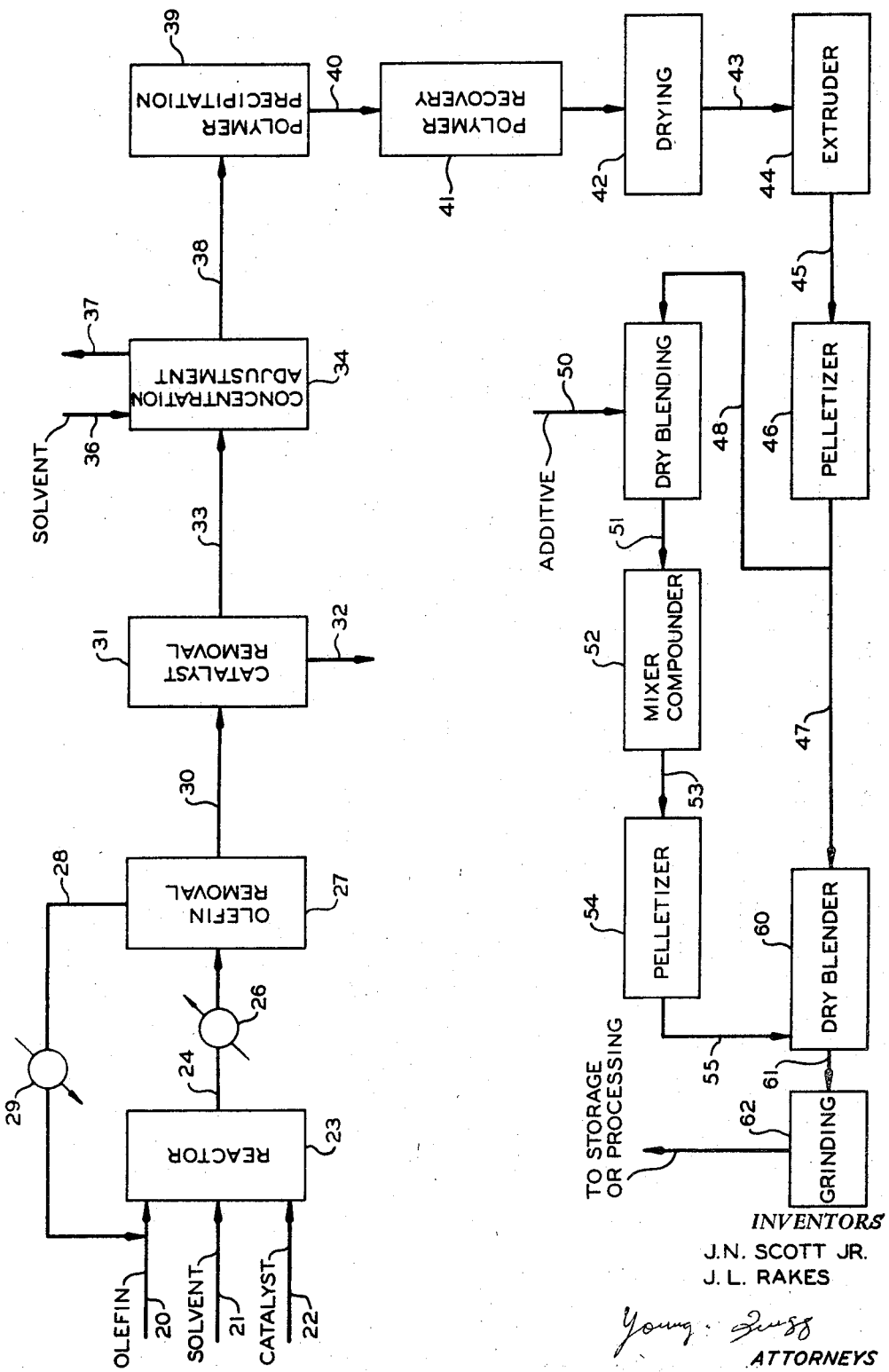

3,404,124
DISPERSION OF ADDITIVES IN SOLID POLYMER
John N. Scott, Jr., and James L. Rakes, Bartlesville, Okla., assignors to Phillips Petroleum Company, a corporation of Delaware
Filed Sept. 2, 1965, Ser. No. 484,548
5 Claims. (Cl. 260—45.85)

ABSTRACT OF THE DISCLOSURE

A concentrate of an organic stabilizer additive in a polymer is prepared by conventional melt blending techniques. Solid polymer is formed, for instance by extruding and pelletizing said concentrate, and said solid polymer containing said additive is blended with additional pelletized base polymer and ground to form a particulate mass having a particle size within the range of about 10 to 450 mesh. This resulting blend is allowed to stand as the additive migrates from the concentrate into the base polymer so as to stabilize the entire mass.

---

This invention relates to a method of dispersing organic additives or combinations thereof in solid polymers.

In another aspect this invention relates to dispersing organic additives in solid thermoplastic polymers to produce a stabilized resin composition.

In one of its more specific aspects, this invention relates to a method of dispersing organic additives such as antioxidant, antistatic and ultraviolet light stabilizers in polymers of propylene, ethylene, butene-1, and copolymers thereof.

Conventional methods of dispersing additives such as stabilizers and pigments into solid resinous polymers, blend polymer pellets and a concentrated amount of pigment thoroughly on a roll mill or in a Banbury mixer. The resulting concentrate of additive and polymer is mechanically worked with virgin polymer to obtain a uniform dispersion of additive. The mechanical working entails high shear mixing in the molten state of the additive concenrate and the virgin polymer on a roll mill, in a Banbury mixer, mixing extruder, etc. This process is relatively expensive to the total cost of producing the polymer compound and furthermore subjects all of the polymer to a necessary amount of high heat treatment. It is well known in the art that intense heat degrades the physical properties of thermoplastic polymers. Therefore, polymer which is produced with less total heating will result in producing an improved plastic article.

The present invention discloses a method of adding organic additives to thermoplastic polymers which eliminates most of the high shear and consequently high temperature mixing.

It is an object of our invention to provide an improved method of dispersing additives in solid thermoplastic polymers.

Another object of this invention is to incorporate additives into solid polymer so that as compared to prior methods only about one-twentieth of the mechanical working for additive dispersion is required.

It is still a further object of this invention to reduce the cost of dispersing additives into a solid polymer by the use of a natural property of organic additives.

A further object of the present invention is to improve the finished polymer by reducing the heat requirement for producing said polymer.

Yet another object of this invention is to produce a stabilized resin which can be stored in powder form without degrading.

Other objects, advantages, and features of our invention will be apparent to those skilled in the art from the following discussion, claims, and drawings in which:

The drawing is a simplified flow diagram of a polyethylene polymerization process which includes polymer recovery and one method of additive addition thereto according to our invention.

In the drawing, olefin, solvent, and catalyst are fed by lines 20, 21 and 22, respectively, to reactor 23. The polymerization is carried out on a continuous basis and the reactor effluent which includes a solution of polyolefin and hydrocarbon solvent with the catalyst in suspension passes from reactor 23 through line 24. The effluent is heated in heat exchanger 26 and passed to olefin removal zone 27 wherein the unreacted monomer is flashed and removed through line 28. The olefin is cooled by heat exchanger 29 and returned to the reactor with fresh olefin. The effluent then passes through line 30 to catalyst removal zone 31 where catalyst is withdrawn by conventional means through line 32. Polymer solution then passes through line 33 into a concentration adjuster 34. Solvent is either evaporated or introduced as needed to adjust the polymer concentration for the polymer precipitation in zone 39. A slurry of polymer and liquid passes by line 40 to polymer recovery zone 41 which includes filtration, centrifugation, settling or the like and the polymer is then dried in zone 42. The polymer thus recovered is a light, fluffy material which consists either of stingy or agglomerated particles, depending upon the conditions of precipitation used. This polymer is then melted in an extruder in zone 44 and pelletized in zone 46. About one-twentieth of the pellets are passed through line 48 to zone 50 where the desired additive or additives are introduced. The other nineteen-twentieths of the pellets are passed through line 47 to the dry blender in zone 60. The pellets with the concentrated additives in zone 50 are passed through line 51 into Banbury mixer, roll mill, or compounder where the pellets and addtives are subjected to high shear mixing to produce the concentrated polymer additives which is then passed through line 53 to pelletizer 54. The concentrated polymer additive pellets are then dry blended with virgin base polymer pellets from line 47 in zone 60. The blend of concentrated additive pellets are passed through line 61 where they are ground to a powder in the range of about 20–450 mesh in zone 62.

This blending of the finely ground additive concentrate and base polymer allows the additive to migrate out of the concentrate and into the virgin polymer. In the prior art all of the concentrate and base polymer had to be mixed in the molten state to achieve uniform dispersion of the additive throughout the polymer. This invention, therefore, eliminates the need for this high temperature-high shear mixing.

Of course, the rate of migration of the additive is dependent on the particular additive used. Temperature also affects the migration.

Several practical uses of this invention can be seen immediately. Antioxidant free polymer cannot be stored because it would degrade in a few months due to oxidation. The migration of antioxidant added to the polymer by the present invention is fast enough to keep the polymer from degrading during storage. The time for migration of the antioxidant ranges from a few hours if the polymer is stored in a hot warehouse to a few days if storage takes place in the winter.

However, because of the increased rate of migration with temperature increases, the powder mixture may be used immediately after grinding, the migration taking place during the heating cycle before fusion occurs. For this reason the present invention is ideally suited for production of resin for powder molding and fluidized bed coating.

In general, if any organic additive will migrate in a polymer, that polymer is suitable for use in the method of this invention. Vinyl polymers and polymer of 1-olefins are particularly suitable for use. Exemplary polymers include 1-pentene, 1-hexene, 1-octene, 4-methyl-1-pentene, 4-methyl-1-hexene, 5-ethyl-1-hexene, 6-methyl-1-heptene, and the like. Polymers and copolymers of propylene, ethylene, and butene-1 are especially adapted for use in the present invention.

This invention is not limited to the use of particular additives beyond the fact that it is used with organic additives and not inorganic material or fillers. The literature on stabilizers which has been developed in recent years is so large that it would unnecessarily prolong this specification to list all possibilities. A simple test will show whether any additive can be used. If migration occurs, the additive is suitable.

Heat stabilizers and antioxidants which have been recommended for polyolefins include alkylated phenols, alkylated diphenols, thio bis alkylated phenols, aromatic amines, organic phosphites, B B' thio propionic acid esters, and phenol nickel complexes. Ultraviolet light stabilizers include phenyl salicylates, benzotriazoles, hydroxyl benzophenones, dibenzoyl resorcinol, and dialkyl methylene malonitriles. Antistatic additives include polyethylene glycols, polyethylene glycol esters, and alkylated long chain aliphatic amines. Mixtures of these additives are frequently used and are quite suitable for the present invention.

To further illustrate the advantages of our invention the following example is presented. The materials used and concentrations, as well as other specific conditions, are offered as typical and should not be construed to unduly limit the invention.

Example

Unstabilized polyethylene blends having a density of 0.955 (ASTM D1505–60T) and a melt index of 13 (ASTM D1238–62T, 230° C., 2,160 grams) were used in the work. Using a roll mill, this resin was compounded with 0.5 weight percent 2,6-di-tert-butyl-para-cresol (Ionol) and one weight percent dilaurylthiodipropionate to form a concentrate. The concentrate was extruded to form pellets the size of the base resin, about ⅛ inch in length and 1/16 inch in diameter, and pellets of the concentrate were blended with an additional quantity of the unstabilized resin in a weight rate of 1 part of concentrate to 19 parts of base resin. The blend was pulverized in a micropulverizer to produce a powder which would pass a 35-mesh screen. The blend had a concentration of 0.025 and 0.05 weight percent, respectively, of the two stabilizers.

After standing at room temperature for six hours, the powder was tested to determine whether a good dispersion of the stabilizer was obtained. In this test the powder was heated to a temperature considerably above that actually used in powder molding. With a good dispersion no yellow spots should appear; with a poor dispersion, yellow spots will appear. For the blend prepared above, there were no yellow spots, therefore indicating that a good dispersion was obtained. For a control the same test was run on two other resin compositions using the same additives and same final concentrations. The first run was made by conventional compounding, high shear mixing in the molten state, in which the additives were melted into the total amount of resin and the resin powdered. The heating test showed no yellow spots. Although this method adequately dispersed the additive throughout the polymer, it subjected the entire polymer to an extra high temperature-high shear mixing. Consequently, this type of process is undesirable since excessive heat degrades the physical properties of thermoplastic polymers.

The second control was run by dry blending the stabilizers by themselves with previously formed polymer powder. In this case, yellow spots appeared upon heating the polymer, thus indicating a poor dispersion of additive in the polymer.

As shown by the above example it is seen that uniform additive dispersion in solid polymer can be obtained by compounding only a small fraction of the solid polymer with the additive and mixing this pelletized additive concentrate with pelletized base polymer, and then grinding this blend to allow the additive to migrate out of the concentrate into the virgin polymer thereby stabilizing the entire lot.

Broadly, the amount of additive to be used in producing the concentrate is in a range of 0.01–20 weight percent additive to polymer with a preferred range of 0.5–1.0 weight percent additive to polymer. The final amount of dispersed additive in the blended polymer will be 0.0025–5 weight percent additive to polymer with a preferred concentration of 0.025–0.05 weight percent additive to polymer. This means that the weight ratio of base polymer to concentrated polymer should be in the broad range of 2:1 to 100:1 with a preferred range from 15:1 to 25:1.

The blended pellets should be ground between 10–450 mesh with 16–50 mesh preferred.

What is claimed is:

1. A method of incorporating at least one organic stabilizer into a normally solid thermoplastic 1-olefin polymer which comprises: producing a concentrate of said additive in said polymer by compounding 0.01 to 20 weight percent of said additive into said polymer, forming a solid polymer in pellet form of said melt blended concentrate, dry blending said solid polymer concentrate pellets with an additional amount of said thermoplastic polymer in pellet form, the ratio of said additional polymer to said concentrate being within the range of 2:1 to 100:1, grinding the resulting blend while still in the solid state to obtain a powder-like blend of material, having a particle size within the range of 10 to 450 mesh, and thereafter maintaining said polymer in the solid state for a time sufficient to achieve incorporation of the additive throughout the entire amount of polymer by the natural effect of the polymer additive migrating out of the concentrate into the base polymer.

2. A method of incorporating at least one organic stabilizer into a normally solid polymer of at least one 1-olefin selected from the group consisting of ethylene, propylene, and butene, which comprises producing a concentrate of said additive and said polymer by melt blending 0.01 to 20 weight percent of said additive into said polymer, forming a solid polymer in pellet form of said melt blended concentrate, dry blending said solid polymer concentrate with an additional amount of said thermoplastic polymer in pellet form, the ratio of said additional polymer to said concentrate being within the range of 2:1 to 100:1, grinding the resulting blend while still in the solid state to obtain a powder-like blend of material, having a particle size within the range of 10 to 450 mesh, and thereafter maintaining said polymer in the solid state for a time sufficient to achieve stabilization of the entire amount of polymer by the natural effect of the polymer additive migrating out of said concentrate into said base polymer.

3. The method according to claim 2 wherein said concentrate contains 0.5 to 1 weight percent of said at least one organic stabilizer, the ratio of said additional polymer to said concentrate is within the range of 15:1 to 25:1, the resulting blend is ground to a particle size of 16 to 50 mesh, and the amount of stabilizer in the compounded polymer and the proportions of the two polymers used being selected to give a final product containing 0.025 to 0.5 weight percent of the stabilizer therein.

4. The method according to claim 2 wherein said organic stabilizers comprise 2,6-di-tert-butyl-p-cresol and dilaurylthiodipropionate.

5. A method of making stabilized polyethylene powder which comprises compounding raw base polyethylene with 0.5 weight percent 2,6-di-tert-butyl-p-cresol and 1 weight percent dilaurylthiodipropionate, pelletizing the compounded polyethylene, mixing pellets of the compounded polymer with additional raw base polyethylene in pellet form in a weight ratio of 19 parts raw polyethylene to one part of compounded polyethylene, and grinding the mixture in the solid state, whereby the additives migrate from the compounded polyethylene to the raw polyethylene.

References Cited

FOREIGN PATENTS 1,306,942  11/1961  France.

OTHER REFERENCES

Modern Plastics Encyclopedia—vol. 41/No. 1A, September 1963, p. 399. Article entitled "Colorants for Plastics" by Flesher et al.

DONALD E. CZAJA, *Primary Examiner.*

V. P. HOKE, *Assistant Examiner.*